US007450974B2

(12) United States Patent
Bennett et al.

(10) Patent No.: US 7,450,974 B2
(45) Date of Patent: *Nov. 11, 2008

(54) PEER-TO-PEER COMMUNICATION IN A RADIO NETWORK

(75) Inventors: Frazer David Bennett, Cambridge (GB); David Julian Clarke, Cambridge (GB); Alan Henry Jones, Cambridge (GB); Matthew David Leask, Cambridge (GB); Anthony Paul Osborn, Huntingdon (GB); Douglas Terence Todd, Ontario (CA)

(73) Assignee: AT&T Laboratories Cambridge Limited, Cambridge (GB)

( * ) Notice: Subject to any disclaimer, the term of this patent is extended or adjusted under 35 U.S.C. 154(b) by 543 days.

This patent is subject to a terminal disclaimer.

(21) Appl. No.: 10/772,666

(22) Filed: Oct. 4, 2004

(65) Prior Publication Data

US 2005/0032556 A1      Feb. 10, 2005

Related U.S. Application Data

(63) Continuation of application No. 09/509,674, filed on Apr. 29, 2002, now Pat. No. 6,697,649.

(30) Foreign Application Priority Data

Jan. 10, 1997    (GB) .................................. 9720856

(51) Int. Cl.
*H04B 1/38*    (2006.01)
*H04M 1/00*    (2006.01)

(52) U.S. Cl. .................... 455/574; 455/343.4; 455/517; 455/518; 455/519; 455/500; 455/502; 455/41.2; 455/127.5; 370/350; 370/400; 370/410; 370/458; 370/459; 370/461; 370/462

(58) Field of Classification Search ............ 455/41.1–2, 455/574, 522, 517–520, 445, 458, 500, 502, 455/343.2–5, 507–514, 550.1, 552.1, 127.1–5; 370/318, 350, 458–462, 400–414
See application file for complete search history.

(56) References Cited

U.S. PATENT DOCUMENTS 5,307,074 A  *  4/1994  Janex .......................... 342/41
5,511,232 A  *  4/1996  O'Dea et al. ................. 455/519

(Continued)

FOREIGN PATENT DOCUMENTS

EP         0599632         6/1994

(Continued)

OTHER PUBLICATIONS

Jubin et al: "The Darpa Packet Radio Networl Protocols," Proceedings of the IEEE, vol. 75, No. 1, Jan. 1987, p. 21-32.

(Continued)

*Primary Examiner*—Tuan A Tran (57) ABSTRACT

A mobile radio network comprises a plurality of communication points, each of which are capable of communicating with any other communication point. Each communication point has a proximity sensor, a transmitter/receiver (14), which is able to send signals to and receive signals from the other communication points. Elements for controlling the transmitter/receiver and elements for storing data to identify the communication points is also described.

10 Claims, 3 Drawing Sheets

U.S. PATENT DOCUMENTS

| | | | |
|---|---|---|---|
| 5,560,021 A | * | 9/1996 | Vook et al. .................. 713/323 |
| 5,602,854 A | * | 2/1997 | Luse et al. .................. 370/313 |
| 5,790,946 A | * | 8/1998 | Rotzoll .................... 455/343.1 |
| 6,192,230 B1 | * | 2/2001 | van Bokhorst et al. ... 455/343.3 |
| 6,697,649 B1 | * | 2/2004 | Bennett et al. .............. 455/574 |

FOREIGN PATENT DOCUMENTS

| | | |
|---|---|---|
| GB | 2237707 A | 5/1991 |
| GB | 2304002 A | 3/1997 |
| WO | 97 25826 A | 7/1997 |
| WO | 98 17032 A | 4/1998 |

OTHER PUBLICATIONS

International Search Report, completed Mar. 12, 1999.
British Search Report, dated Jan. 28, 1998.

* cited by examiner

| QUERY | REPLY |
|---|---|
| GetAttribute("/name") | "/name"="Temperature Sensor" |
| GetAttribute("temp/C/value") | "/temp/C/value"="17" |
| WatchAttribute("/temp/C/change5") | "WatchHandle 01" |
|  | 01 "/temp/C"="24" |
| UnwatchAttribute (01) |  |

PEER-TO-PEER COMMUNICATION IN A RADIO NETWORK

CROSS REFERENCE TO RELATED APPLICATION

This application is a continuation of U.S. patent application Ser. No. 09/509,674, filed Apr. 29, 2002 now U.S. Pat. No. 6,697,649, which is based on PCT Application No. WO 99/17566, filed Jan. 10, 1998, this PCT Application claiming the priority of UK Application No. 9720856.5, filed Jan. 10, 1997.

TECHNICAL FIELD

This invention relates to a mobile radio network and in particular to a mobile radio network that can be used with a wide variety of portable devices such as mobile computers, mobile phones, personal organizers, etc.

BACKGROUND OF THE INVENTION

There is at present a divide in mobile computing between what is desirable and what is practical to implement. The divide is caused by, inter-alia, constraints in size and power as well as the lack of reliable network connection. There are a wide variety of mobile devices currently in use which would benefit from being part of a network which enables them to communicate with other devices.

Because of the large variation in the types of devices which include data processing functions and which could be included in a network, these are very different communicational requirements. There is, however, at the very least at base level of connectivity which is desirable for the most simple of functions such as monitoring the status of a particular device.

SUMMARY OF THE INVENTION

Preferred embodiments of the present invention provide what we shall refer to as embedded networking. This is concerned to provide a network that is so simple and small that it can be used by almost anything. The network comprises a communications medium (typically radio), proximity sensors associated with devices, and a distributed database of resources. It enables everyday objects to be able to communicate in a way which has not yet been achieved. Many everyday electronic devices e.g. telephones, fax machines, photocopiers, electronic access controls, ATM machines and public information terminals already need a network in order to operate. However, all can benefit from a common mechanism by which they are made aware of and can communicate with other things nearby.

Preferred embodiments of the present invention provide a broad range of mobile and embedded objects which can detect by radio, other objects in their environment capable of connecting to them, can connect to these with a low range ad hoc radio network, and can exchange any data necessary. To achieve this a basic node circuit has been developed which can provide connections directly to the objects in which they are embedded and which can communicate by radio to other similar nodes in their vicinity.

Preferably, the nodes operate automatically to communicate with other nodes in their vicinity and to exchange any necessary data.

The node is preferably provided on a single chip included in a device such as a mobile telephone, laptop computer, printer, etc.

BRIEF DESCRIPTION OF THE DRAWINGS

The invention will now be described in detail by way of example with reference to the drawings in which.

DETAILED DESCRIPTION

Figure 1A:
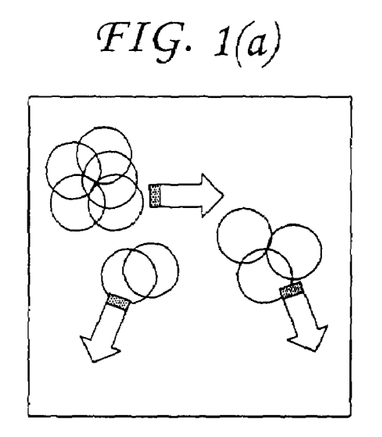
FIG. 1(a) and (b) show two different types of communication systems which are provided by an embodiment of the present invention.
Figure 1B:
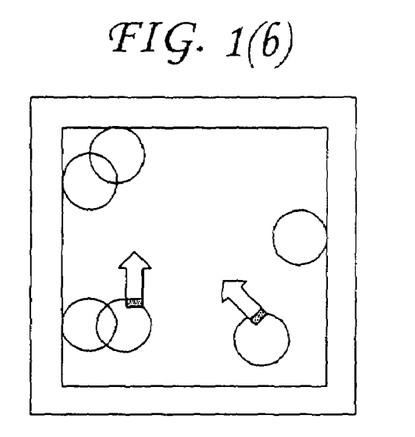

To understand the usefulness of an embedded network we shall consider two different ways in which mobile devices can use services available from an embedded network. FIG. 1(a) and (b) shows these schematically.

FIG. 1(a) shows a set of nodes or communication points which are able to move around by remain in range of each other. This is referred to as a cloud of devices of the type which might be carried about by a person in luggage, in a vehicle or between a small group of people working in the same environment. Such devices can be made aware of each other via their nodes which can communicate by radio with other nodes and offer services to each other. They may be able to use each other's services sometimes for extended periods. For example, a personal data organizer may be authorized to use the mobile telephone of its user for e.g. sending and receiving messages by fax or E-mail.

FIG. 1(b) shows endpoints which include nodes and which move around occasionally coming within range of other nodes that provide services to which they have no special authorization. This is referred to as a nomadic node. The sort of services it might use are those that tell it about its environment e.g. position and local facilities, and those which might allow it to personalize another node by configuring it in a way that is suitable for a particular user. For example, a telephone may be pre-primed with a set of commonly dialed numbers when it detects a node owned by the person who has those commonly dialed numbers nearby.

Thus, preferred embodiments of the present invention provide a system which is able to operate the systems outlined with reference to FIGS. 1(a) and (b).

Radio technology is used for communications between nodes. This is because it possesses the characteristics needed for ad hoc, peer-to-peer communications in virtually all configurations and environments. The type of interaction which is required between nodes must be unrestricted, that is to say nodes must be able to communicate when in range even if they are being carried in a briefcase, coat pocket etc. Thus, infrared communication would not be appropriate in the general case because it requires a line of sight to be able to communicate.

Systems embodying the present invention are decentralized. That is to say, every device must be able to independently describe itself to a sufficient level for it to be useful to others. This decentralized approach is used because knowledge about nearby objects which have nodes associated with them is more important than the knowledge of other devices which are not nearby. In particular, using such a system eliminates the need to contact and maintain a centralized database wherever a new node is encountered. That would require global connectivity.

Figure 2:
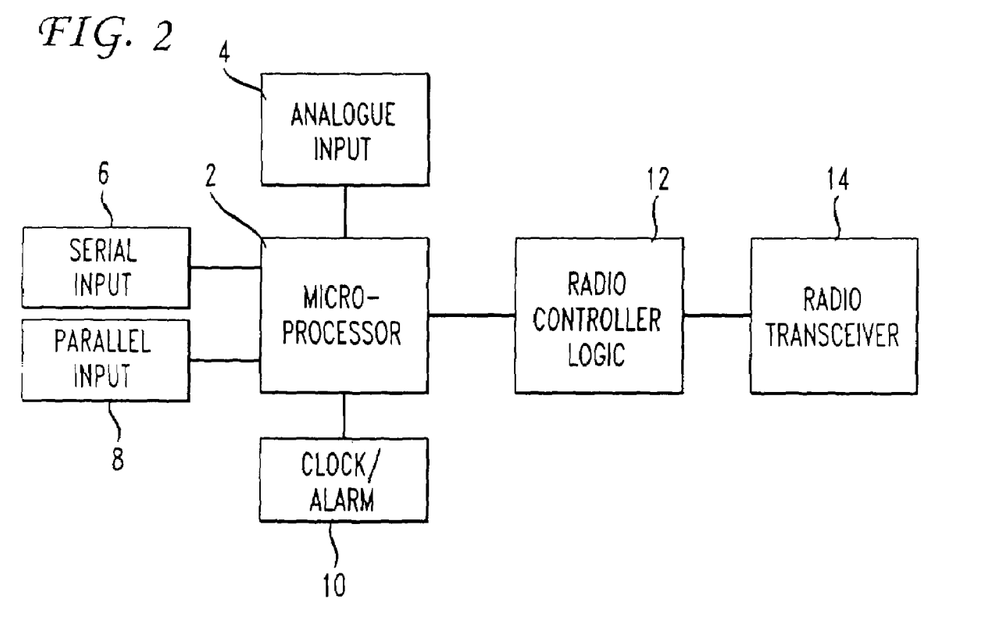
FIG. 2 shows a block diagram of a node for use in a mobile radio network embodying the present invention.

FIG. 2 shows a block diagram of a node suitable for use in the mobile radio network. The core of this is a micro processor 2. This has three possible inputs, an analog input 4, a serial digital input 6, and a parallel digital input 8. In some special situations, it may be necessary to provide other inputs. Also, coupled to the microprocessor is a clock/alarm device 10. This wakes up the processor from low power sleep at programmed intervals.

Radio controller logic 12 is connected to the micro processor 2 for controlling the provisions of signals to and from the microprocessor and this is used to control a radio transceiver 14 via which signals are sent to and received from other nodes which are in range. A 418 MHZ FM transceiver is suitable for this purpose but other frequencies could be used.

Figure 3:
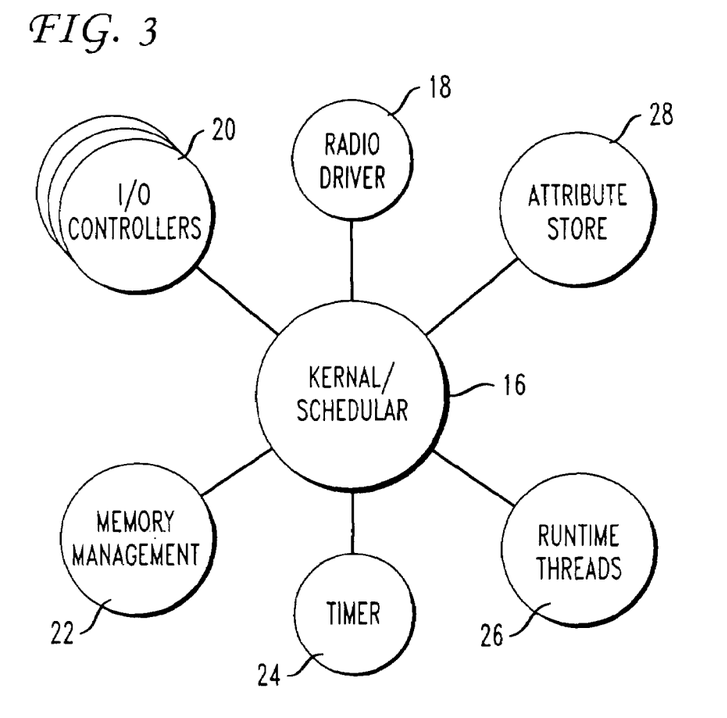
FIG. 3 shows a schematic diagram of the software used by the circuits of FIG. 2.
Figure 4:
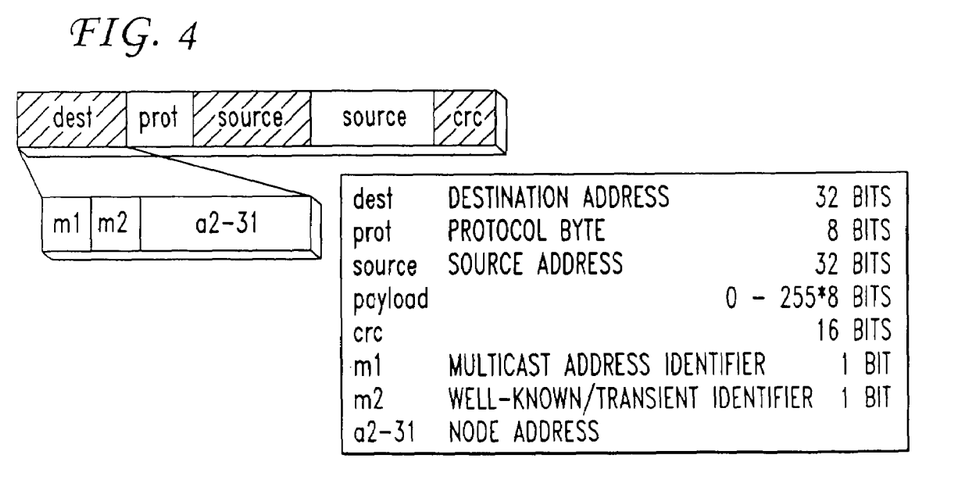
FIG. 4 shows a datagram of the radio protocol used for communication between nodes in an embodiment of the invention.

An example of the software scheme which could be loaded into the microprocessor 2 if FIG. 2 is shown in FIG. 3. A set of outputs corresponding to inputs 4, 6, 8 may be provided to send control signals to a device with which the node is associated. At its core is a kernel/scheduler 16 which is used to order all the functions of the node. This controls a radio driver 18 which is used by the radio controller logic 12. Memory management block 22 is used to organize temporary and permanent storage of data by the node. Timer software 24 controls the clock/alarm 10. A set of run time threads 26 are used to control data communications to and from the node once a nearby node has been detected, and an attribute store 28 which is used to store naming data and data describing the device with which the node is associated. This data is then used to identify and describe the device to other nearby nodes.

Preferably the range of the radios used by nodes in the mobile radio network is constrained to about 5 meters. This makes the system into a proximity sensor as well as a radio network. This allows small low powered and cheap radios to be used. Because this range is small, greater re-use of the radio channel is available thereby increasing the aggregate bandwidth available for transmissions. Finally, it sets the system up to work at human ranges, that is to say it enables communication between objects that are within a human's immediate surroundings. In this case, those devices which are nearby to a person are things which can be connected to by the mobile radio network.

Usually, if a device is close enough to be used by a person then it is one which should become part of the mobile radio network. Similarly, a few devices carried around by a person such as a mobile phone and a personal data organizer should be able to spontaneously inter-communicate when required.

The radio protocol for the mobile radio network is selected to fit in with the ad hoc nature of the mobile radio network. That will be the protocol which provides short self-contained transactions between nodes rather than long sequences of patterns. Furthermore, some form of multicast communication between nodes must be possible to enable a device to communicate to all other devices in its vicinity that it is present and available for exchange of services. Also, some data about proximity and link quality between nearby devices is desirable.

A suitable radio protocol for the system uses 4b6b encoded FM keying. A datagram showing the format of transmissions in the radio protocol format used is given in FIG. 5. This comprises source and destination nodes, and addresses identifying the node from which data is being sent and for which it is intended. It also contains a protocol byte and payload length. The protocol byte is used internally in a node to determine how data is to be handled. The payload may contain up to 255 bytes of data being transmitted to another node. Because the data packet is fairly short, encoding and decoding for transmission is kept relatively simple. In addition, the use of small packets results in a better sharing of the radio channel between nodes since no single device will be transmitting for too long.

Communication clouds of the type shown in FIG. 1(a) will communicate with a well known group of nodes about which data is stored. Chance encounter transmissions of the type shown in FIG. 1(b) are with transient groups of nodes with which a node associated with a particular device occasionally comes within range.

Figure 5:
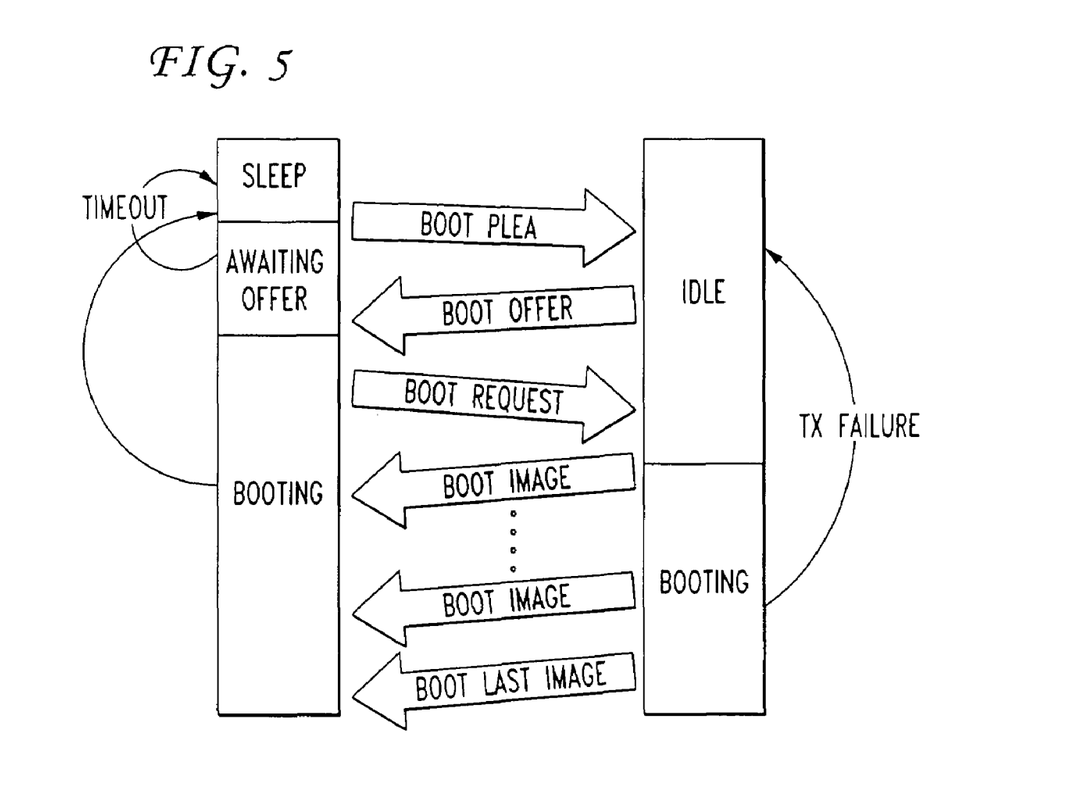
FIG. 5 shows a radio boot protocol.

As shown in FIG. 5 the top two bits of the node address are used to identify the type of multicast group to which transmissions are to be made. Well known multicast addresses are used for pre-defined purposes and each of these are universally recognized by any node that may want to make use of it. Transient multicast allows dynamic creation of a multicast group, possibly for temporary collaboration or sharing between nodes. When a transient multicast group is created by a random 30 byte address is nominated by one node for use by the group. Without any arbitration in the allocation of these addresses the statistical improbability of an addressing clash in both time and space is used to avoid conflicts. This address allocation strategy is used to serve the ad hoc nature of the mobile radio network.

The components used in nodes are selected to make it easy to interface with the many different types of device that will use it. These will range from simple sensors which require analog, digital or serial input, to devices which may require more elaborate communication with the node. Each must have a common mechanism for use of the radio channel, particularly for device identification and description.

Furthermore, it is preferable for it to be easy to configure a node for a particular task by booting it with application specific code. Furthermore, mobile nodes need to save power wherever possible. This means that the radio interface must be powered down most of the time. The two main components of the run time of a node are the kernel and the loader. The kernel 16 represents the environment that directs the operation of a node and provides drivers for the node's interfaces. Applications are downloaded into a node via the loader and are then run within the context of the kernel. The kernel exists in ROM in microprocessor 2. External RAM is provided to store specific applications, an application being a piece of code which is used to configure a node to perform specific tasks such as to act as an interface to a sensor connected to the node.

The kernel 16 has a simple multi-threaded design. Within the kernel threads communicate by passing messages between one another. This is node via pairs of message queues managed by the scheduler. The kernel includes a number of system threads which are used to manage the internal components of the node. Alongside these, application or runtime threads 26 are used to make a node perform a particular task. The scheduler strategy employed dictates that any thread currently running must complete before any other thread can commence. Threads are identified by unique thread Ids. System threads are given well-p0known Ids. Application threads may be used to replace system threads thus upgrading the runtime environment and given the programmer control over a node.

A node is configured for a particular task by booting software into it through one of its external interfaces. This may be via the radio interface or via the hardware input shown in FIG. 2. Once configuration is complete the node will retain its configuration indefinitely.

The radio booting procedure begins with a boot plea from the unconfigured node. This is issued on a well known multicast address, and contains details about the node such as its address, domain and version number. A node configured as a boot server may respond to the boot plea with a boot offer. A server does this after analysis of the boot plea in order to determine whether or not it has a suitable image to offer to that node. Upon receipt of a boot offer the node may decide to accept it and in doing so issues a boot request. After this the boot image is relayed to the node from the boot server node. This boot image may contain code and/or data. This procedure is illustrated in FIG. 5.

Use of the radio boot protocol extends beyond merely configured a node. It represents a more general mechanism by which code and data can be passed between nodes. This is useful for dynamically upgrading the interface that a node offers to a particular service. Dynamic reconfiguration of a node has implications for power saving. There is a cost trade off between transmission and computation particularly in a low powered device. When transmission is much more costly than computation, it may be more efficient to configure a node with a particular decompression algorithm before sending data to it.

The attribute store 28 in the micro processor 2 is used to interpret data received over the radio interface of a node. Generally, it is necessary to map the source and destination addresses to particular types of devices. Additional information about the node may well be required in order to make any sense of data received from it. As the mobile radio network has no infrastructure base stations each node has to be individually responsible for describing itself to other nodes and for any other node to be able to interrogate it to determine what kind of services it requires or provides. The attribute store performs this function. The attribute store is a hierarchical directory structure of (name, value) pairs. It is available as a general resource within a node for presenting any kind of information to other nodes. It is a resource used both internally within the node and externally as a presentation interface to other nodes. No type of information is stored in the attribute store since this could restrict the applications to which it can be put and will make its implementation more complicated. Standard names are used in the attribute store and these allow other nodes to discover the services available in their vicinity and to make use of them.

Figure 6:
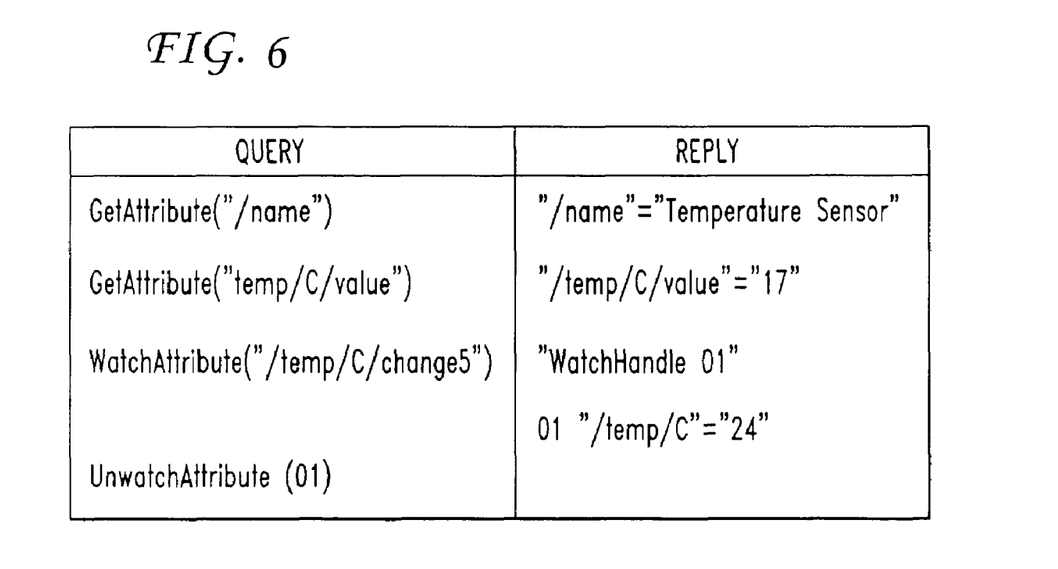
FIG. 6 shows enquiries to and responses from an attribute store in an embodiment of the invention.

The facilities are best described by way of example. A simple temperature sensor with a node interface intercepts information provided by the sensor and makes it available over the mobile radio network. Another node which comes within the range of this temperature sensing node will make the enquiries set out in FIG. 6. The first enquiry is to get attribute name and the response is that the name is Temperature Sensor. The second enquiry asks for value associated with "temperature" and the response to this is 17. Finally, a watch request is sent. This causes the temperature sensing node to issue a notification of any change of temperature by passing the new temperature to the watching node. A watch will be cancelled after a predetermined period of time if the watching node does not renew it. Other more complex interrogation procedures are used for more complex devices.

A node may be combined with a small low powered display to make the wireless portable information point. These can be provided within a building at pre-determined points so that a user may interrogate the node and the display will show information about past and present activity of the node.

Nodes can be provided in many different forms. Some will be plugged into permanent power supplies to provide network access, environmental sensing, display services etc. Others will be included in portable devices and will be as small and lightweight as possible and would be powered by a coin sized power cell. These low power nodes will have to spend most of the time in sleep mode in which they can neither transmit nor receive radio signals. This leaves the problem of how low power nodes will ever discover each other's presence within their radio range if they are only active for short intervals.

One way this can be done is by synchronizing their powered up time either by the use of internal clocks or an external time reference. Internal clocks tend to drift but this is something that can be overcome by periodic resynchronization. There may also be problems with initial synchronization where two groups of differently synchronized nodes come within range of each other. External time references put extra hardware and complexity into every node and it is preferable to avoid these.

Another means by which the low power node may connect to another low power node is to use a low power RF detection circuit which responds to a transmission from another node to bring the lower power node out of sleep mode.

In order to enable nodes to identify each other, low power nodes are controlled to come out of sleep mode periodically and transmit a broadcast packet of data containing their unique ID. After the broadcast transmission, the low power node waits for a short period with its receiver on to detect if any other node is attempting to transmit back to it. Any node in the vicinity that receives the first broadcast packet has a short time to decide whether or not to respond with a transmission addressed to the low power node while the receiver is still on. The low power node, if it receives a response addressed to it during the short receive period, remains with its receiver on for a longer period, or responds with a transmission, and normal communications can be established.

Nodes in the vicinity may be able to listen for long periods for broadcast transmissions because they have greater power resources, or because they do this temporarily at particular times, or because they have been temporarily primed to listen by a special signal. This signal could be derived from a button that has been pressed to initiate rendezvous, or an environmental sensor such as a light detector or accelerometer, or some action by another node such as a specially coded radio transmission received by a very low power receiver or a burst of ultrasound or infra-red radiation. A typical time between the two transmissions of the broadcast packet will be 30 seconds but could be more or less frequent depending on the particular application.

Rendezvous is the term given to the means by which nodes initiate interaction. This may be done by some signaling communication on the radio channel between nodes. In order to describe how rendezvous may take place, we introduce the terms client and server to describe the entities involved in the rendezvous procedure.

The server provides as a service some piece of information, which may or may not be the result of a request from a client. The client request may contain information pertinent to the service being offered by the server—parameters of the service, if you like. In this case, a more traditional query-response architecture is adopted whereby the client will issue a query containing the query's parameters. The query will be given an answer, the response, by the server.

In such a configuration, the client and server must rendezvous before the parameters can be sent. This might be done by the server periodically "beaconing", sending a short radio packet to announce its presence. A client wishing to make use of the service will respond to the beacon with its request.

Under some circumstances, the service offered by the server may be independent of any client parameters. In this case, it is possible to conserve the total power consumed within the system by introducing a "service in beacon" strategy. In this scheme, the server will periodically beacon, announcing its existence, and in addition, a service response will be held within the payload of the beacon. In doing this, the server precludes the need for any client to issue a query and wait for a response from the server, since the client has already received the response from the service it was looking for.

Another power waving mechanism which might be adopted in the rendezvous procedure is that of Proxy Rendezvous. Consider the scenario where more than one client is waiting to make use of a nearby service. The normal way in which these clients would do this would be to have all the clients listening independently for the beacon from the server, and to all respond to this beacon with their specific queries.

We can, however, optimize the total power consumption within a system of this kind by introducing a scheme of Proxy Rendezvous. Under this scheme, clients would "beacon" announcing their presence, and their interest in making use of a particular service, along with any query parameters they may have for this service. In hearing that another client is interested in making use of the same service as itself, the clients can rendezvous with each other, and nominate a client to "stay awake", waiting for the server's beacon. Other clients interested in this service can now sleep, and will re-rendezvous with the nominated client, who will have interacted with the server in their behalf.

In a system where every node periodically broadcasts its unique ID the wake up time is followed by a brief interval for reception of data from other nodes. Nodes can be arranged to listen to the available channel for longer periods at certain times to update them on the other nodes available in the vicinity.

In another application, where a person has gathered together all the nodes that they wish to communicate with, only one of the nodes needs to be triggered into remaining active. This can then trigger all of the others as they make their periodic transmissions. Within a minute or so all nodes which are in range of the initial trigger should be able to intercommunicate directly and will have learned of each others' presence.

Some nodes are associated with devices with large power supplies e.g. cellular phones, notebook computers, cars, and some will be connected to main electricity. These can remain active at all times and as with other nodes can be arranged to broadcast their IDs periodically e.g. every 30 seconds. These are referred to as listening nodes. When they detect a broadcast from another node they will look it up in a cache of recently detected nodes and if necessary will interrogate it to find out what it is and what services it offers and requires. If they have sufficiently recent information they will not respond. If a lower power node (A) is interrogated by a listening node (L) it can request a list of other recently seen nodes identified by their Ids. In addition, if node L overhears a service-in-beacon transmission, which may be marked as cacheable, it can store this service response alongside the node Id. This "cached" response would be marked as valid for a fixed time period. During this period, node L can re-transmit the cached response as a "proxy" for the service-in-beacon node. In this way, power consumption on the service-in-beacon node may be reduced. If it does not have knowledge of all the Ids it can immediately request details about them from the cache maintained by the listening node L. If the now power node (A) wishes to communicate with one of those recently seen nodes (B) it can choose to remain active for a pre-determined period of time e.g. 30 seconds and respond directly to the next broadcast from node B. It may even obtain a hint about how often and how recently that node broadcasts from the listening node L. If the node L cannot provide enough information about node B for A to make a decision then node A will remain active for long enough to establish direct contact with B and obtain sufficient details. Thus, the listening node is used purely as a hint device with communications being established directly if there is any interest. This is important since the other nodes may no longer be in the vicinity, ie node B may have moved away from the listening node and may also have moved away from node A. Once the nodes are in contact A and B can power down for pre-determined periods and power up to transmit and listen for each other's presence. However, if it extends for too long the nodes will assume that they have lost contact and will return to their default state.

Other techniques may be adopted to save power progressively as a power source is consumed. A node could be arranged to detect a low battery condition and to make this available as a attribute to be read by a maintenance node. Levels of service offered by a node could be reduced as the node runs short of power. Finally, the node could lengthen the interval between its broadcast transmissions as its power runs out.

Higher data rates may be more attractive to nodes since the power per bit transmitted or received tends to be lower at higher bit rates. However, there will be a trade off with power consumption when a node was listening over a longer period since high speed radio receivers tend to consume more energy when receiving than transmitting. It may therefore be desirable to use a secondary radio for rendezvous purposes.

A particular set of nodes can be programmed for them to recognize each other and provide very specific services. For example, personal data organizer may recognize a telephone over which it is allowed to make calls or a printer to which it may send a document. Bringing the relevant device with its node into proximity with the phone or the printer will trigger these sorts of activities. Thus, it is the users action that causes things to happen. Once triggered connectivity between nodes may continue for some time.

If the embedded controllers in modern consumer devices were to be replaced with nodes, these devices could then communicate with each other when they are close enough to each other. Thus for example, any device that requires the time to be set (video cassette recorder, microwave oven, central heating controller etc.) would be able to obtain an update whenever one of them is set. This update could come from a service such as the radio data system, teletext, or the global positioning system that one of the nodes receives. Alternatively, it could be set by the user.

If the digital communications device is linked to a node then the communications medium may be used to control or interact with other nearby devices including nodes. For example, at home a modem on the telephone line equipped with a node could allow remote access to program a video cassette recorder, or central heating, or perhaps to control house lighting. A cellular phone equipped with a node would allow a portable computer to send and receive data messages must be being brought into sufficiently close proximity. Alternatively, calls could be diverted to a nearby wired telephone to save cellular band call costs. A network computer with a node could allow access to a nearby personal data organizer or display devices to exchange E-mail and important data files etc.

The mobile radio network could also be used for context aware applications. If a node is allocated to an individual it can be programmed with their personal preferences for common systems. For instance, telephone lists can be carried in the node and edited on any suitable computer. This could then be used to set the user interface on telephones equipped with nodes to set speed dialing programs.

Nodes could also be used in the working environment to act as beacons. For example, a node in a meeting room could request other nodes to be quiet when told that a meeting is in progress. This could then be used to suppress alarms, telephone calls, chimes etc. This node could also be linked to the meeting room booking facility to gain information on what the meeting was about. This could be recorded by participants' personal nodes along with the text names of other nodes at the meeting thus forming a record of their activities.

Nodes can also adopt a common format for location determination. Nodes that are known to be static e.g. the meeting room beacons, can be told their locations and can then make this available to passing nodes. Nodes attached to positioning systems (e.g. GPS) can make dynamic location information available in the same format in cars and aircraft. This data could then be used to trigger events when other nodes pass nearby. Personal nodes can record location against time and build up an accurate trace of where the node has been. Personal data organizer alarms for meetings etc can be related to location and will be given earlier if the organizer is far away but suppressed if the organizer is heading in the right direction or has arrived at the location. Devices such as digital video recorders and cameras can tag their recorded information with locations discovered by an attached node.

Nodes can be used to augment direction signs with information about the routes to thousands of destinations. For example, road signs can carry electronic information about which exit to take to any destination in the UK that can be described by post code and street number. The user of a navigation device would enter the post code and number of their destination. The device would pass this to any nearby road signs which would respond with the appropriate exit to take and any ancillary information such as distance, expected journey time, road conditions etc this and other information could then be presented to the user on the display.

This of course is only one example. Nodes could be used to guide passengers on public transport, through buildings, around museums and galleries etc. Information could be made time dependent and could be updated swiftly in case of diversions or delays. It could also be personalized by the type of route e.g. scenic, fast, cheap, most stairs.

Another example, of how nodes could be used could be as a substitute for the presently used taped audio tours used in museums and outdoor tourists sites. With a node and a random access medium such as a mini disk the user could be free to vary the recommended itinerary. Routes could be customized to level of interest or length of time for the tour. If several people were taking the tour together their commentaries could be synchronized whenever they are together so that they are all looking at the same object at the same time. If nodes were provided on doorways and pathways and connected into a backbone network then lost tour members could be located. Finally, at the end of the tour a personalized printout containing the route followed and more details of the items where more time was spent could be automatically generated.

The above are only a few examples of the possible applications of this mobile radio network and the nodes required for it. Many other applications are possible.

The kernel has been designed with component modularity in mind. A thread and its associated state are encapsulated, and independent from the rest of the running kernel. Since threads only communicate by way of message queues, their interface to other threads is well constrained. This is very convenient from a perspective of code mobility. It is very natural to be able to migrate a thread and its state from one node to another, via any of its external interfaces—in particular a serial line or the radio interface.

By making code mobility an inherent part of the system design, we have encouraged a programming model which exploits the physical mobility of the system. One way in which nodes can interact is by sending a thread or threads from one device to another. These threads can perform some function on the remote node, log some data from a peripheral for example, and then return to the original host.

In addition, code mobility could be used to minimize the total power consumption within the system. For example, if node A had a large amount of data to send over the radio interface to node B this may consume a large amount of energy because it would mean the radio transceiver being powered in both nodes for some considerable time. It may be more efficient for node B to send a thread containing a data compression algorithm to node A, and for node A to send compressed data over the radio interface, which would be decompressed at node B. By reducing the amount of data sent over the radio in this way, we may reduce the total energy consumed in the system.

A sub-component of the Attribute Store is the Proximity Store. The Proximity Store contains a list of devices which have been interacted with, or overheard, on the radio channel recently. The structure of the Proximity Store is the same as that of the Attribute Store, and the interface that it presents to other components within a Piconet node is the same. The Proximity Store will retain the unique Id of any node that it has overheard recently, alongside as much information about that node as it has been able to determine. This might include a node's top-level service description, its beacon interval, and its transmission characteristics. Internal components of a node may make use of the Proximity Store as a trigger to indicate the arrival or departure of a particular node or type of node, as well as a hint as to the state of the local environment—which nodes it has spent a long time with, for example.

In addition to storing a dynamic profile of the state of the local network environment, the Proximity store incorporates a component which maintains an historical record of the contents of the Proximity Store over time. This is used by internal components of the node to build up a broader view of the traffic profile of the radio network.

What is claimed is:

1. A mobile communication point for use in a mobile radio network comprising a plurality of communication points, each capable of communicating with other communication points, the communication point comprising     a transmitter/receiver for sending signals to and receiving signals from the other communication points, the communication point comprising a transmitter/receiver for sending signals to and receiving signals from the other communication points; and     means to switch the communication point between a high power mode for transmitting or receiving signals and a low power mode defined as a sleep state wherein the communication point is unable to transmit or receive signals, the communication point being controlled to come out of sleep state periodically and broadcast a packet of data containing its unique identity, each communication point of the plurality of communication points broadcasting its unique identify during random timer intervals;

data storage means for storing data identifying the communication point and storing data identifying other communication points which have been interacted with recently, and wherein the communication point determines whether data about a second communication point is stored in its data storage means upon receipt of a transmission from the second communication point, wherein the first communication point is responsive to as request from a second communication point to transmit data about a third communication point from said data storage means to the second communication point.

2. A mobile communication point according to claim 1 in which the communication point waits for a short period after broadcast of its unique identity to detect whether any other communication point is attempting to transmit back to the communication point before returning to the sleep state.

3. A mobile communication point according to claim 2 in which the communication point remains able to transmit or receive signals for a longer period if the communication point receives a response addressed to said communication point during the receive period.

4. A mobile communication point according to claim 1 in which the communication point includes means responsive to an external input to cause the switching means to switch the communication point from low power mode to high power mode.

5. A mobile communication point according to claim 4 in which the means responsive to an external input comprises a low power RF detection circuit responsive to a radio transmission.

6. A mobile communication point according to claim 4 in which the means responsive to an external input comprises an ultrasonic detector.

7. A mobile communication point according to claim 4 in which the means responsive to an external input comprises an infrared detector.

8. A mobile communication point according to claim 4 in which the means responsive to an external input comprises a manual input.

9. A mobile communication point according to claim 1 in which the communication point is responsive to a transmission from a second communication point to send interrogation signals to the second communication point.

10. A mobile communication point according to claim 1 in which the communication point can remain active at all times.

* * * * *